US011704828B2

(12) United States Patent
Ohgushi et al.

(10) Patent No.: US 11,704,828 B2
(45) Date of Patent: Jul. 18, 2023

(54) ROAD OBSTACLE DETECTION DEVICE, ROAD OBSTACLE DETECTION METHOD, AND COMPUTER-READABLE STORAGE MEDIUM

(71) Applicant: TOYOTA JIDOSHA KABUSHIKI KAISHA, Toyota (JP)

(72) Inventors: Toshiaki Ohgushi, Tokyo (JP); Kenji Horiguchi, Tokyo (JP); Masao Yamanaka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/069,328

(22) Filed: Oct. 13, 2020

(65) Prior Publication Data

US 2021/0117703 A1    Apr. 22, 2021

(30) Foreign Application Priority Data

Oct. 18, 2019    (JP) .................................. 2019-191439

(51) Int. Cl.
*G06T 7/73* (2017.01)
*G06T 7/11* (2017.01)
(Continued)

(52) U.S. Cl.
CPC ............ *G06T 7/73* (2017.01); *G06F 18/2413* (2023.01); *G06T 7/11* (2017.01); *G06V 10/82* (2022.01);
(Continued)

(58) Field of Classification Search
CPC ........ G06V 20/58; G06V 20/41; G06V 10/82; G06V 20/588; G06K 9/627; G06T 7/11;
(Continued)

(56) References Cited

U.S. PATENT DOCUMENTS 10,007,269 B1    6/2018 Gray
2018/0330615 A1* 11/2018 Yamanaka ............... G08G 1/16
(Continued)

FOREIGN PATENT DOCUMENTS

JP    2007-328630 A    12/2007
JP    2012-226556 A    11/2012
(Continued)

OTHER PUBLICATIONS

Canny, John, "A Computational Approach to Edge Detection", IEEE Transactions on Pattern Analysis and Machine Intelligence, Nov. 1986, vol. PAMI-8, No. 6, pp. 679-698.
(Continued)

*Primary Examiner* — Bobbak Safaipour
(74) *Attorney, Agent, or Firm* — Sughrue Mion, PLLC

(57) ABSTRACT

The road obstacle detection device includes a semantic label estimation unit that estimates a semantic label for each pixel of an image using a classifier learned in advance and generates a semantic label image, an original image estimation unit for reconstruction of the original image from the semantic label image, a difference calculating unit for calculating a difference between the original image and the reconstructed image from the original image estimation unit as a calculation result, and a road obstacle detection unit for detecting a road obstacle based on the calculation result.

19 Claims, 16 Drawing Sheets

(51) Int. Cl.
*G06V 20/58* (2022.01)
*G06V 20/40* (2022.01)
*G06F 18/2413* (2023.01)
*G06V 10/82* (2022.01)
*G06V 20/56* (2022.01)

(52) U.S. Cl.
CPC .............. *G06V 20/41* (2022.01); *G06V 20/58* (2022.01); *G06T 2207/20084* (2013.01); *G06T 2207/30261* (2013.01); *G06V 20/588* (2022.01)

(58) Field of Classification Search
CPC . G06T 2207/20084; G06T 2207/30261; G06T 7/73
See application file for complete search history.

(56) References Cited

U.S. PATENT DOCUMENTS

| | | | |
|---|---|---|---|
| 2018/0373263 | A1 | 12/2018 | Gray |
| 2020/0098135 | A1* | 3/2020 | Ganjineh ........... G01C 21/3811 |
| 2020/0272834 | A1* | 8/2020 | Motoyama ........... G06V 20/647 |
| 2021/0110174 | A1* | 4/2021 | Ohgushi ................ G06V 10/82 |
| 2021/0117703 | A1* | 4/2021 | Ohgushi .............. G06F 18/2413 |
| 2021/0374440 | A1* | 12/2021 | Yamanaka .......... G06F 18/2193 |
| 2022/0067882 | A1* | 3/2022 | Ohgushi ................... G06T 5/50 |
| 2022/0327738 | A1* | 10/2022 | Kosugi .................. G16H 40/40 |

FOREIGN PATENT DOCUMENTS

| | | |
|---|---|---|
| JP | 2015-042952 A | 3/2015 |
| JP | 2018-194912 A | 12/2018 |
| JP | 2019-008796 A | 1/2019 |

OTHER PUBLICATIONS

Krzysztof Lis, et al., "Detecting the Unexpected via Image Resynthesis" (version 2), arXiv.org [online], Apr. 17, 2019, pp. 1-18 (18 pgs). arXiv:1904.07595v2.

* cited by examiner

ROAD OBSTACLE DETECTION DEVICE, ROAD OBSTACLE DETECTION METHOD, AND COMPUTER-READABLE STORAGE MEDIUM

CROSS-REFERENCE TO RELATED APPLICATION

This application is based on and claims priority under 35 USC 119 from Japanese Patent Application No. 2019-191439 filed on Oct. 18, 2019, the disclosure of which is incorporated by reference herein.

BACKGROUND

Technical Field

The present disclosure relates to a road obstacle detection device, a road obstacle detection method, and a computer-readable storage medium that stores a road obstacle detection program.

Related Art

Japanese Patent Application Laid-Open No. 2018-194912 (Patent Literature 1) discloses a technique of assigning a semantic label to an image, dividing the image into local regions, and calculating the likelihood of there being an obstacle from the probability of the semantic label of the local region.

Specifically, an obstacle detection device including a local region dividing unit and a likelihood calculating unit has been proposed. The local region dividing unit divides the input image into a plurality of local regions. The likelihood calculation unit calculates a probability that an obstacle on the road exists in the target local region based on a probability that the obstacle is not a predetermined normal object, and a visual saliency defined by a relationship between the peripheral local region and the target local region. Here, the visual saliency is calculated to be larger as the probability that the peripheral local region of a road is higher, and to be larger as the difference between the visual characteristics of the target local region and the peripheral local region is larger.

However, in the technique of Patent Literature 1, a semantic label is given to an obstacle as "an obstacle or other". Therefore, there is a case where the assignment of the semantic label fails. Therefore, there is room for improvement in improving the detection accuracy of obstacles on the road.

SUMMARY

The present disclosure has been made in view of the above, and it is an object of the present disclosure to provide a road obstacle detection device, a method and a computer-readable storage medium for storing a road obstacle detection program capable of improving the detection accuracy of a road obstacle from a case where a road obstacle is estimated from a semantic label.

A road obstacle detection device according to a first aspect includes: an estimation unit that estimates a semantic label for each pixel of an image using a classifier that has been learned in advance and generates a semantic label image; a reconstruction unit that reconstructs original image from the generated semantic label image; and a detection unit that detects an obstacle on the road by comparing the original image and the reconstructed image.

According to the first aspect, the generation unit estimates a semantic label for each pixel of the image using a classifier learned in advance, and generates a semantic label image.

The reconstruction unit reconstructs the original image from the semantic label image generated by the generation unit.

Then, a road obstacle is detected by comparing the reconstructed image reconstructed by the reconstruction unit with the original image. In other words, at the portion where the estimation error of the semantic label has occurred due to an obstacle on the road, the reconstructed image reconstructed from the semantic label image largely deviates from the original image when compared. Therefore, an obstacle on the road can be detected by comparing the reconstructed image with the original image. As a result, it is possible to improve the detection accuracy of the road obstacle as compared with the case where the road obstacle is estimated from the semantic labels.

The second aspect is the road obstacle detection device according to the first aspect, wherein the detection unit detects, as a road obstacle, a portion where a difference between the reconstructed image and the original image is equal to or greater than a predetermined threshold. Thus, a road obstacle can be detected by comparing the reconstructed image with the original image.

The third aspect is the road obstacle detection device according to the first aspect or the second aspect, further including: an extraction unit that extracts a road region and a road neighborhood region, and wherein the detection unit detects a road obstacle in a region extracted by the extraction unit. Thereby, it is possible to suppress detection of unnecessary objects other than those on the road as obstacles on the road.

The fourth aspect is the road obstacle detection device according to the first aspect or the second aspect, wherein the reconstruction unit reconstructs an original image for each of the semantic labels or for each of a plurality of adjacent semantic labels. As a result, the reconstruction can be performed with the image region and image type restricted, so that the reconstruction accuracy can be improved.

The fifth aspect is the road obstacle detection device according to the first aspect or the second, aspect, further including: a summary generation unit configured to generate region summary data of each semantic label, wherein the reconstruction unit reconstructs an original image using the region summary data generated b the summary generation unit. As a result, the quality of the reconstructed image is improved for a portion where the estimation of the semantic label is correct. Therefore, the detection accuracy (S/N) of the portion where the estimation of the semantic label has failed can be improved.

The sixth aspect is the road obstacle detection device according to the first aspect or the second aspect, wherein the classifier is learned by deep learning, and the reconstruction unit is configured to reconstruct an original image by using a semantic label image generated using an intermediate layer of the deep learning network and the semantic label image generated by the generation unit. As a result, the output image of the intermediate layer has a high degree of reconstruction. Therefore, the quality of the reconstructed image can be improved for a portion where the estimation of the semantic label, is correct. Then, the detection accuracy (S/N) of the portion where the estimation of the semantic label has failed can be improved.

The seventh aspect is the road obstacle detection device according to any one of the first to the sixth aspects, wherein the detection unit detects a candidate for a road obstacle by comparing the reconstructed image reconstructed by the reconstruction unit with the original image, calculates a degree of danger of the detected candidate, detects the candidate with the degree of danger equal to or greater than a predetermined threshold as a road obstacle. This makes it possible to detect only important road obstacles posing a high degree of danger.

The eighth aspect is the road obstacle detection device according to any one of the first to the seventh aspect, wherein: the reconstruction unit includes a plurality of types of reconstruction units having different reconstruction methods; and the detection unit compares the reconstructed image reconstructed by each of the plurality of types of reconstruction units with an original image, and detects a road obstacle based on each comparison result. As described above, the original image is reconstructed by the plurality of different reconstruction units, the reconstructed image is compared with the original image, and the obstacle on the road is detected based on each comparison result. Therefore, it becomes possible to more accurately estimate the position of the obstacle on the road.

The ninth aspect is a method for detecting an obstacle on a road including: by a computer, estimating a semantic label for each pixel of an image using a classifier learned in advance to generate a semantic label image; reconstructing an original image from a generated semantic label image and comparing the reconstructed image with the original image to detect a road obstacle.

According to the ninth aspect, similar to the first aspect, at the portion where the estimation error of the semantic label has occurred due to the obstacle on the road, the reconstructed image reconstructed from the semantic label image largely deviates from the original image upon comparison. Therefore, an obstacle on the road can be detected by comparing the reconstructed image with the original image. As a result, it is possible to improve the detection accuracy of the road obstacle as compared with the case where the road obstacle is estimated from the semantic labels.

Note that, as in the tenth aspect, a road obstacle detection program for causing a computer to function as each unit of the road obstacle according to any one of the first to eighth aspects may be used.

As described above, according to the present disclosure, a road obstacle detection device, a road obstacle detection method, a road obstacle detection method, and a computer-readable storage medium storing a road obstacle detection program capable of improving the detection accuracy of a road obstacle from the case of estimating a road obstacle from a semantic label can be obtained.

DETAILED DESCRIPTION

Hereinafter, an example of an embodiment of the present disclosure will be described in detail with reference to the drawings. Hereinafter, a road obstacle detection device that detects a road obstacle from an image captured with an in-vehicle camera mounted on a vehicle will be described as an example.

First Embodiment

Figure 1:
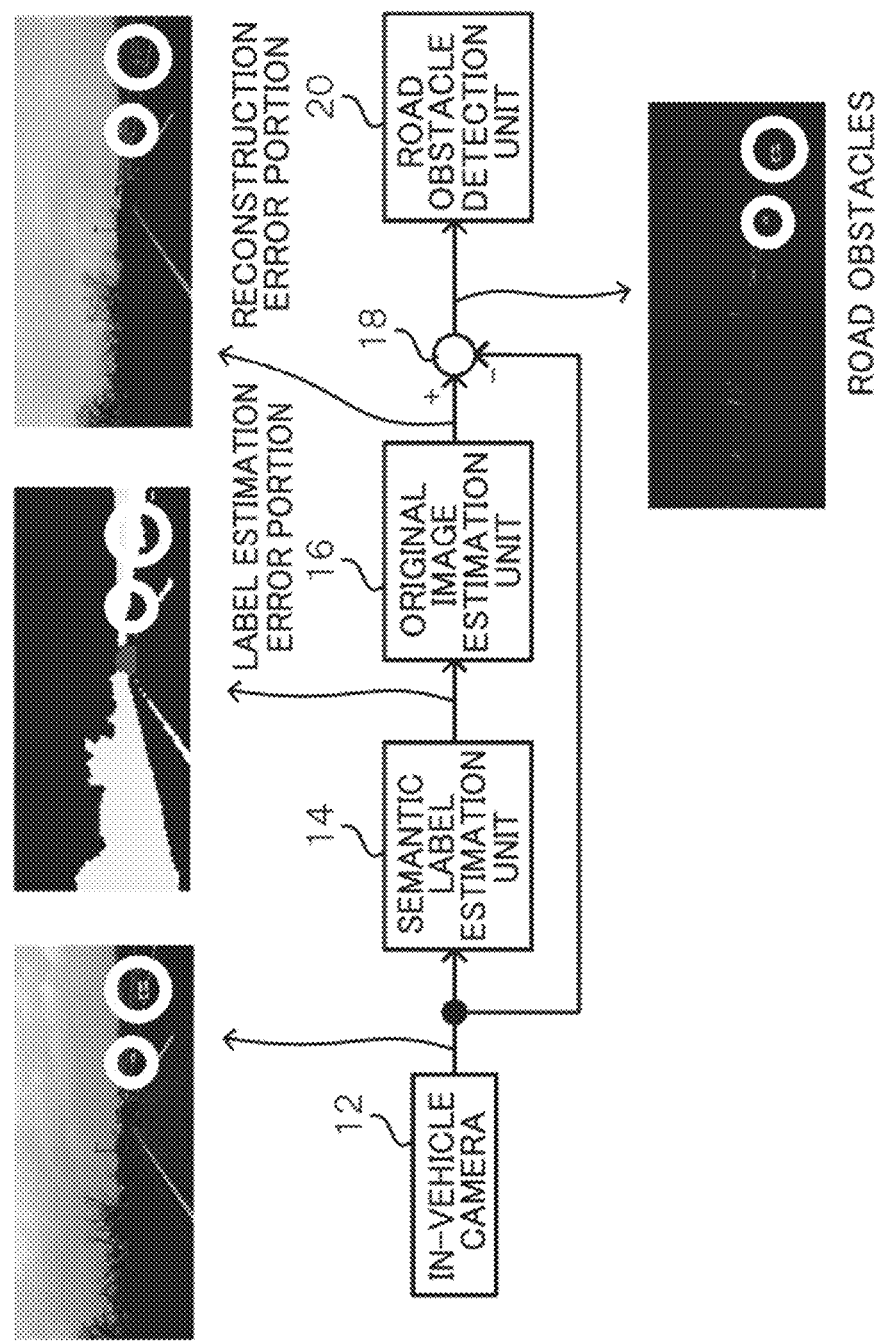
FIG. 1 is a block diagram illustrating a schematic configuration of a road obstacle detection system according to a first embodiment.

A road obstacle detection device according to the first embodiment will be described. FIG. 1 is a block diagram illustrating a schematic configuration of the road obstacle detection system according to the first embodiment.

As shown in FIG. 1, the road obstacle detection device 10 according to the present embodiment includes an in-vehicle camera 12, a semantic label estimation unit 14 as a generation unit, an original image estimation unit 16 as a reconstruction unit, a difference calculation unit 18, and a road obstacle detection unit 20. Note that the difference calculation unit 18 and the road obstacle detection unit 20 correspond to a detection unit.

The road obstacle detection device 10 according to the present embodiment includes, for example, a computer including, a CPU (Central Processing Unit), a ROM (Read Only Memory), a RAM (Random Access Memory), and the like. For example, the function of each unit is realized by the CPU executing a program stored in a ROM or the like. The semantic label estimation unit 14, the original image estimation unit 16, the difference calculating unit 18, and the road obstacle detection unit 20 may be executed by a single computer, or may be executed by a plurality of computers, for instance, per respective function.

The in-vehicle camera 12 is mounted on a vehicle and captures an image of the periphery of the vehicle such as in front of the vehicle. Then, the in-vehicle camera 12 outputs image data representing the captured image to the semantic label estimation unit 14 and the difference calculation unit 18.

The semantic label estimation unit 14 estimates a semantic label for each pixel of the image data obtained from the in-vehicle camera 12 and assigns a semantic label using, for example, a classifier and a learned parameter that has been learned in advance by deep learning. Thus, the image is converted into a semantic label image and output to the original image estimation unit 16. The semantic label estimation unit 14 may include, for example, FCN (Fully Convolutional Network), RNN (Recurrent Neural Network), CNN (Convolutional Neural Network), CRF (Conditional random field), or CRFasRNN (Conditional Random, Fields as Recurrent Neural Networks). The image data can be converted into a semantic label image by using the classifier and the learned parameter learned using such known methods.

The original image estimation unit 16 reconstructs the original image from the semantic label image converted b the semantic label estimation unit 14. Then, it outputs the reconstructed image data representing the original image to the difference calculation unit 18. The original image estimation unit 16 reconstructs the reconstructed image from the semantic label image using, for example, a generator and a learned parameter that have been learned in advance by deep learning. Then, the reconstructed image data that has been reconstructed is output to the difference calculation unit 18. Specifically, the original image estimation unit 16 is configured as a network with a plurality of elements stacked in a layered manner, the elements including, for instance, a convolution layer, an activation layer (ReLU Layer, Softmax Layer, etc.), a pooling 1*a*, and an upsample layer.

The difference calculation unit 18 calculates a difference between the image data from the in-vehicle camera 12 and the reconstructed image data reconstructed by the original image estimation unit 16, and outputs the calculation result to die road obstacle detection unit 20. The difference calculation unit 18 may calculate a simple difference (I (x, y)–P (x, y)) for each pixel with respect to the image data I (x, y) and the reconstructed image data P (x, y) of the in-vehicle camera 12. Alternatively, the correlation for each pixel may be calculated by the following equation.

$$\sum_y \sum_x \|I(x, y) - P(x, y)\|^n \quad (n = 1 \text{ OR } 2) \qquad \text{(Equation 1)}$$

Alternatively, the difference calculation unit 18 may perform a predetermined, image conversion f(•) on the image data from the in-vehicle camera 12 and the reconstructed image data, and then perform the difference comparison. That is, f(I (x, y))–f(P (x, y)) may be calculated. As an example of the image conversion f(•), perceptual loss using a hidden layer output of a deep learning device (for example, vgg16, vgg19, etc.) may be used.

On the basis of the calculation result of the difference calculation unit 18, the road obstacle detection unit 20 determines that a portion where a difference is equal to or greater than a predetermined threshold value has erroneous estimation of a semantic label. Thereby, an obstacle on the road is detected. In other words, in the portion where the estimation error of the semantic label has occurred, the reconstructed image largely deviates from the original image. Therefore, the portion with deviation can be detected as a road obstacle. For example, as shown in FIG. 1, when a semantic label estimation error occurs in an image captured by the in-vehicle camera 12, a reconstruction error portion, where image data is not reconstructed, appears in the label estimation error portion. Therefore, it is possible to detect a road obstacle by taking the difference between the original image and the reconstructed image.

Subsequently, a process performed by the road obstacle detection device 10 according to the present embodiment configured as described above will be specifically described, FIG. 2 is a flowchart illustrating an example of the flow of a process performed by the road obstacle detection device 10 according to the present embodiment.

In step 100, the semantic label estimation unit 14 estimates a semantic label image from the evaluation target image captured by the in-vehicle camera 12, and proceeds to step 102. For example, a semantic label for each pixel of image data obtained from the in-vehicle camera 12 is estimated using a classifier and a learned parameter that have been learned in advance by deep learning, and a semantic label is assigned thereto. Thereby, the image is converted into a semantic label image.

In step 102, the original image estimation unit 16 reconstructs the semantic label image output from the semantic label estimation unit 14 to the reconstructed image, and proceeds to step 104. For example, the reconstructed image is reconstructed from the semantic label image by using the generator and the learned parameter that have been learned in advance by the deep learning.

In step 104, the difference calculation unit 18 calculates the difference between the reconstructed image and the original image, and proceeds to step 106. For example, a simple difference for each pixel between the original image data from the in-vehicle camera 12 and the reconstructed image data is calculated. Alternatively, the difference may be calculated after performing predetermined image conversion on each of the original image data from the in-vehicle camera 12 and the reconstructed image data.

In step 106, the road obstacle detection unit 20 determines whether there is an region where the calculated difference is equal to or greater than a predetermined threshold. When the determination is affirmed, the process proceeds to step 108, and when the determination is denied, a series of processing ends.

In step 108, the road obstacle detection unit 20 detects a portion with a deviation equal to or greater than the threshold value as a road obstacle, and ends a series of processing.

As described above, in the present embodiment, at the portion where the estimation error of the semantic label has occurred, the reconstructed image reconstructed from the semantic label image largely deviates from the original image upon comparison. For this reason, the portion, with deviation can be detected as a road obstacle. As a result, it is possible to reliably detect a road obstacle that has a low frequency of appearance and is likely to fail in estimating a semantic label.

Second Embodiment

Figure 3:
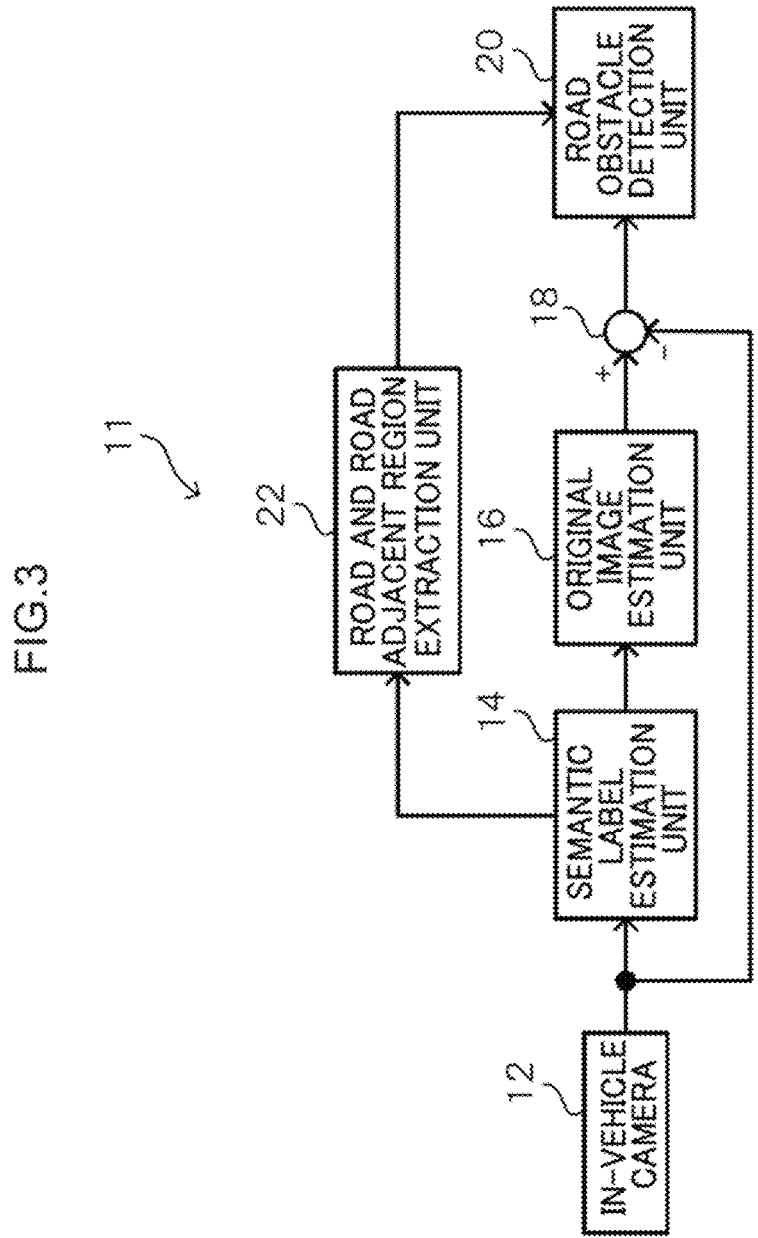
FIG. 3 is a block diagram illustrating a schematic configuration of a road obstacle detection device according to a second embodiment.

Subsequently, a road obstacle detection device according to a second embodiment will be described. FIG. 3 is a block diagram illustrating a schematic configuration of the road obstacle detection device according to the second embodiment. The same components as those in the first embodiment are denoted by the same reference numerals, and therefore detailed description is omitted.

The road obstacle detection device 11 according to the present embodiment further includes a road and a road adjacent region extraction unit 22 as an extraction unit, compared to the first embodiment.

The road and road adjacent region extraction unit 22 acquires a semantic label image from the semantic label estimation unit 14, extracts a road and an region adjacent to the road, and outputs the extraction result to the road obstacle detection unit 20. In the following, a region adjacent to a road may be referred to as a road adjacent region.

Then, the road obstacle detection unit 20 masks the calculation result of the difference calculation unit 18 based on the extraction result, of the road and road adjacent region extraction unit 22. As a result, the detection region for detecting the road obstacle is restricted to the road and the region adjacent to the road. Thus, unnecessary objects other than those on the road are not detected. For example, a reconstruction error of a distant object on the road is ignored.

Figure 2:
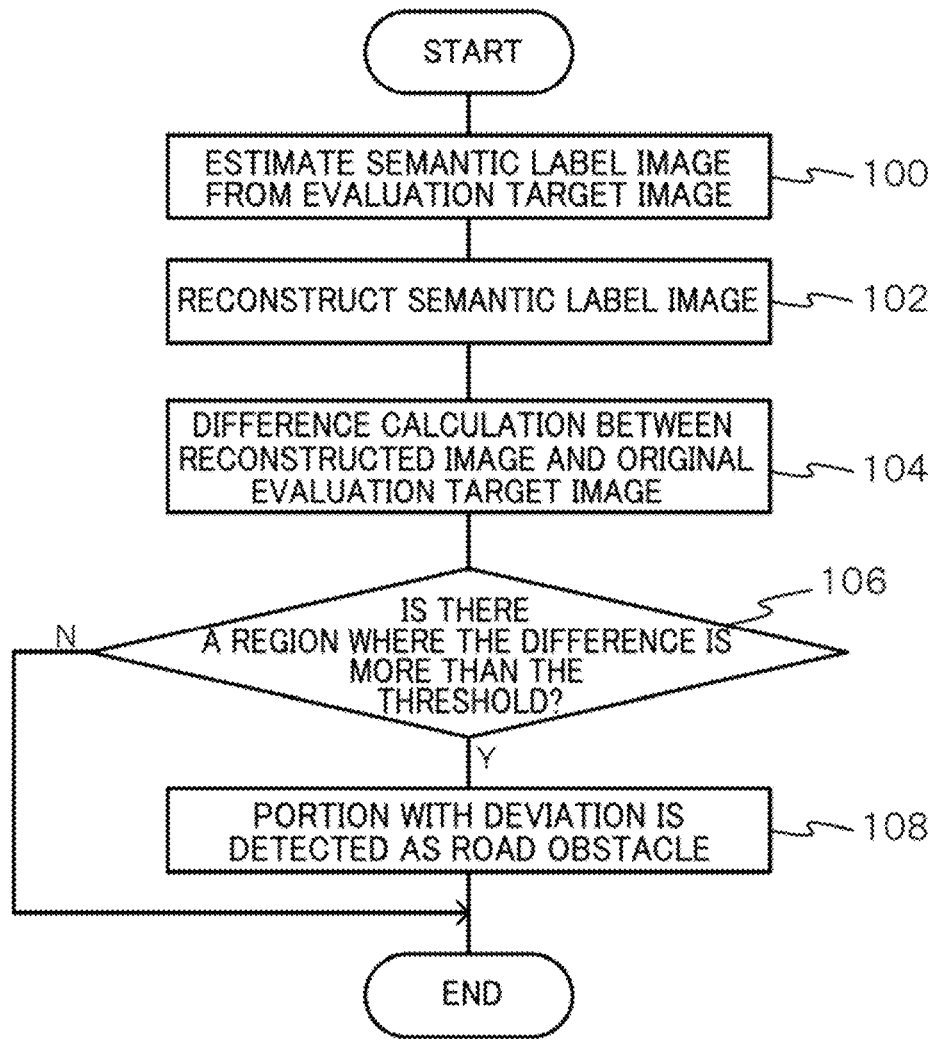
FIG. 2 is a flowchart illustrating an example of a flow of a process performed by the road obstacle detection device according to the first embodiment.
Figure 4:
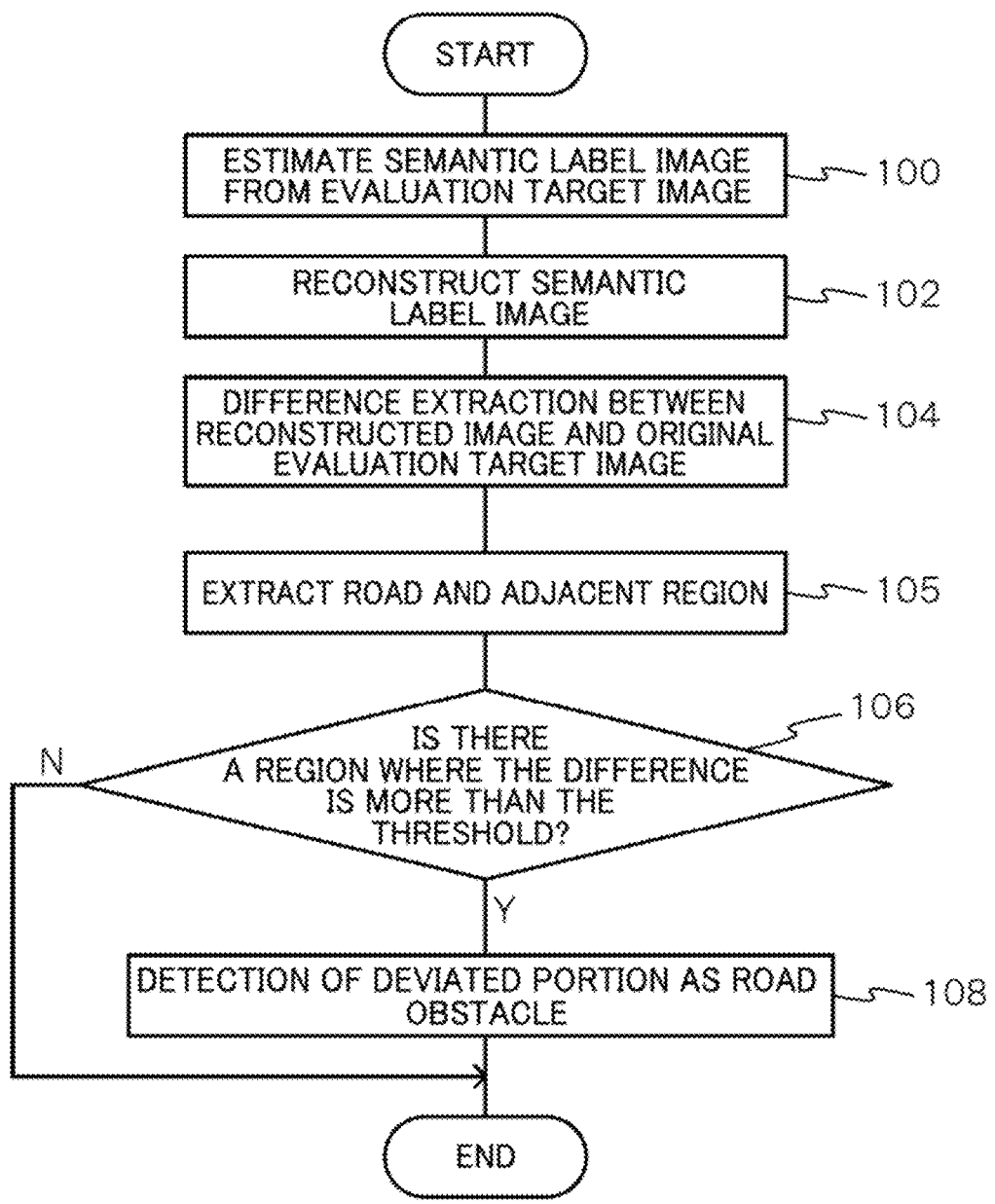
FIG. 4 is a flowchart illustrating an example of a flow of a process performed by a road obstacle detection device according to a second embodiment.

Next, a specific process performed by the road obstacle detection device 11 according to the present embodiment will be described. FIG. 4 is a flowchart illustrating an example of the flow of a process performed by the road obstacle detection device 11 according to the present embodiment. Note that the same processes as those in FIG. 2 are denoted by the same reference numerals, and therefore detailed description is omitted.

That is, after performing the above-described processing from step 100 to step 104, the process proceeds to step 105.

In step 105, the road and road adjacent region extraction unit 22 acquires the semantic label image from the semantic label estimation unit 14, extracts the road and the road adjacent region, and proceeds to step 106.

In step 106, the road obstacle detection unit 20 determines whether there is a region where the calculated difference is equal to or greater than a predetermined threshold. When the determination is affirmed, the process proceeds to step 108, and when the determination is denied, a series of processing ends. Here, in the present embodiment, when the road obstacle detection unit 20 determines whether there is a region where the calculated difference is equal to or greater than a predetermined threshold, the target region is restricted. That is, the calculation result of the difference calculation unit 18 is masked based on the extraction result of the road and road adjacent region extraction unit 22. As a result, the detection region for detecting the road obstacle is restricted to the road and the region adjacent to the road. Thereby, it is possible to suppress detection of unnecessary objects, other than those on the road as obstacles on the road.

Third Embodiment

Figure 5:
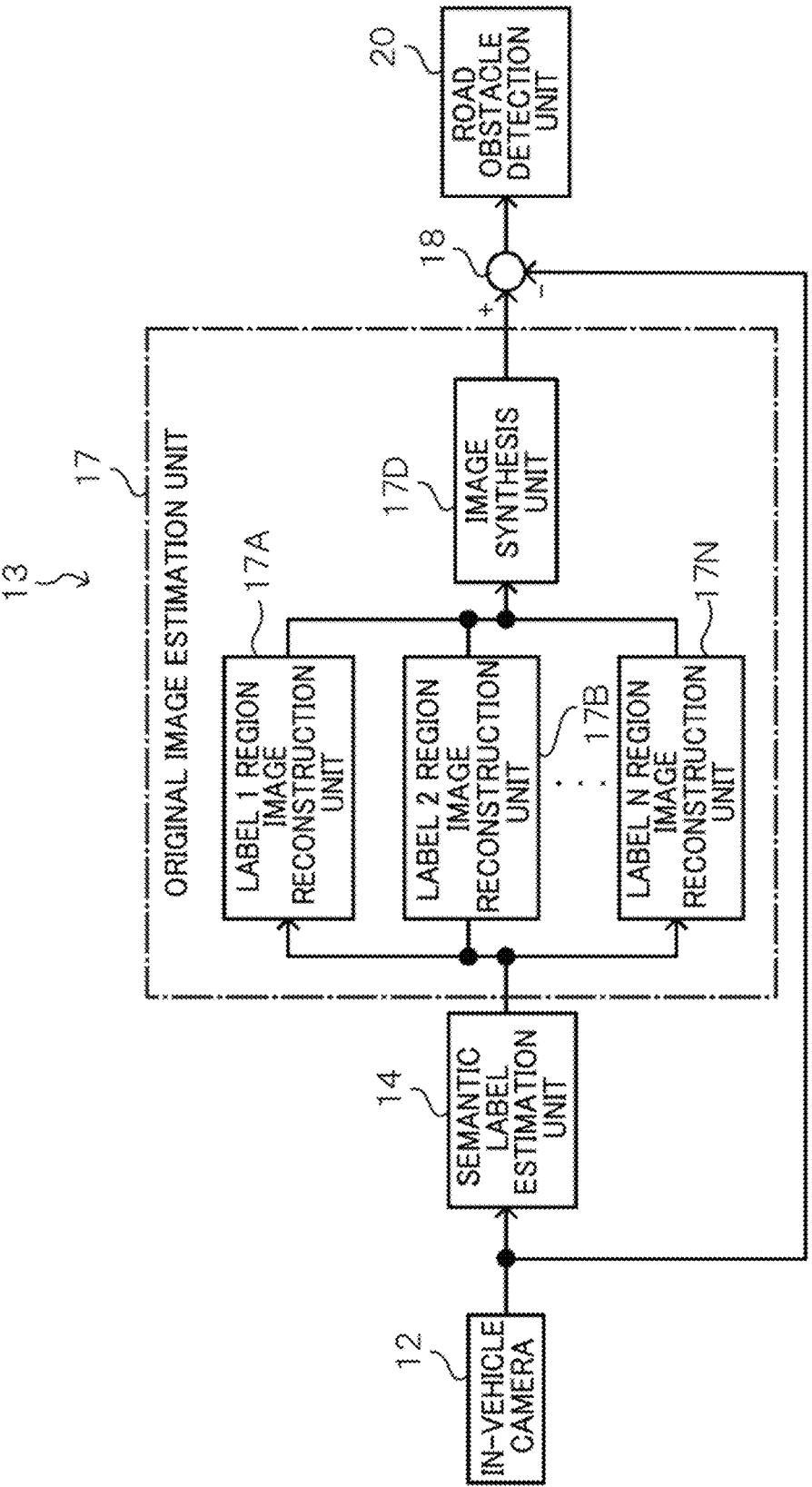
FIG. 5 is a block diagram illustrating a schematic configuration of a road obstacle detection device according to a third embodiment.

Next, a road obstacle detection device according to a third embodiment will be described. FIG. 5 is a block diagram illustrating a schematic configuration of a road obstacle detection device according to the third embodiment. The same components as those in the first embodiment are denoted by the same reference numerals, and, therefore detailed description is omitted.

The road obstacle detection device 13 according to the present embodiment is provided with an original image estimation unit 17 that performs a process partially different from the original image estimation unit of the first embodiment.

The original image estimation unit 17 in the present embodiment includes a plurality of label region image reconstruction units including a label 1 region image reconstruction unit 17A, a label 2 region image reconstruction unit 178, up to a label N region image reconstruction unit 17N, and an image synthesis unit 17D.

The label 1 region image reconstruction unit 17A, label 2 region image reconstruction unit 17B, up to label N region image reconstruction unit 17N are provided corresponding to each semantic label, and reconstruct a semantic label image for each label. Accordingly, the image region and image type assigned to the label region image reconstruction unit becomes restricted, so that reconstruction accuracy can be improved. Note that the label region image reconstruction unit may be provided for each single label, or may be provided for each of a plurality of labels. By providing for each of a plurality of labels, reconstruction accuracy is improved by reconstruction from adjacent labels. In addition, less calculation resources are required than providing for each single label. Further, the calculation resources of the label region image reconstruction unit may be changed according to the reconstruction priority. Examples of the reconstruction priority include higher priority to the object closer to the road, the size of the label region, the complexity of the image (for example, the dispersion of the pixel luminance), and the like.

The image synthesis unit 17D generates the entire reconstructed image by synthesizing the reconstructed images for each label reconstructed by the plurality of label region image reconstruction units.

Figure 6:
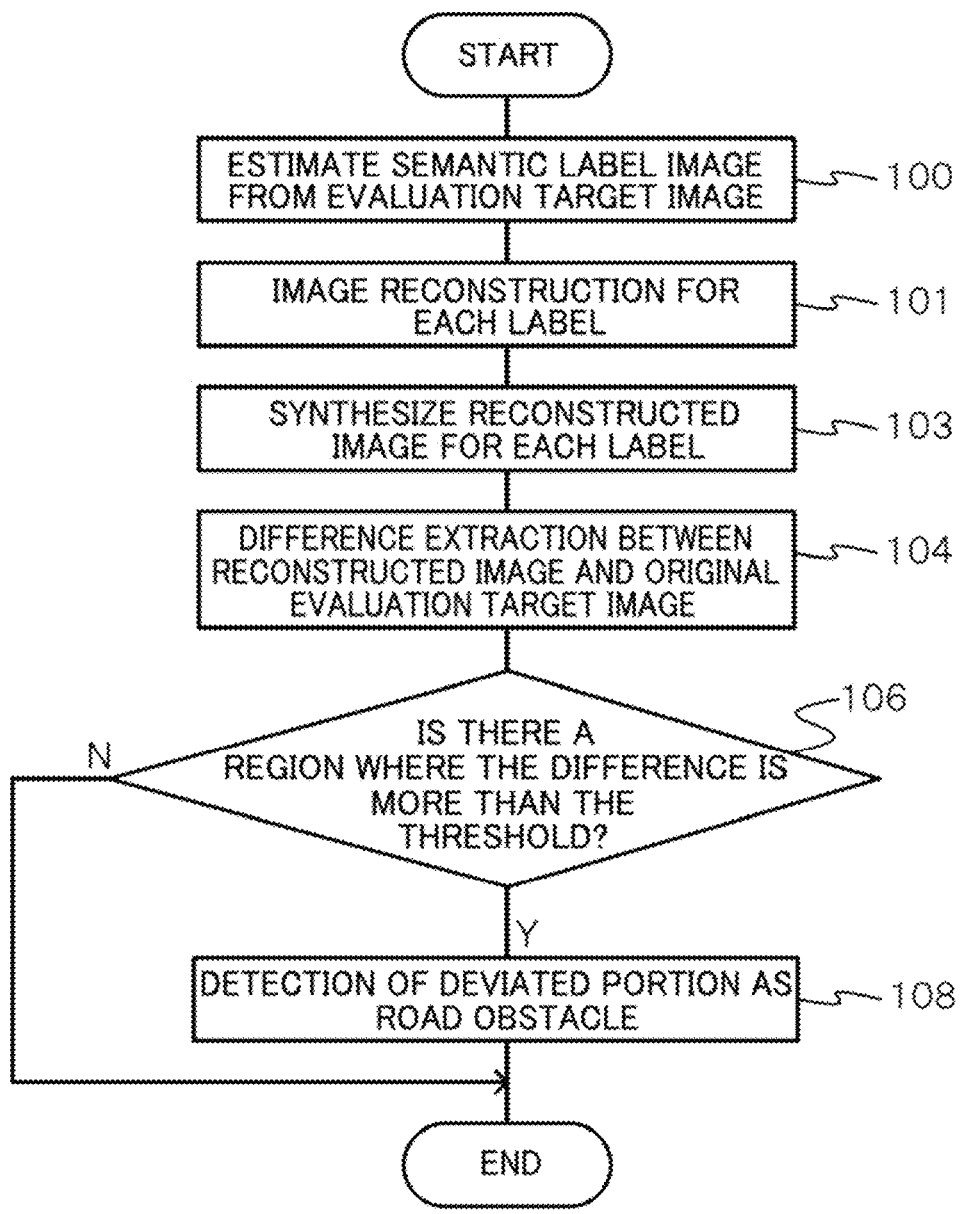
FIG. 6 is a flowchart illustrating an example of a flow of a process performed by a road obstacle detection device according to a third embodiment.

Next, specific processing performed by the road obstacle detection device 13 according to the present embodiment will be described. FIG. 6 is a flowchart illustrating an example of the flow of a process performed by the road obstacle detection device 13 according to the present embodiment. Note that the same processes as those in FIG. 2 are denoted by the same reference numerals, and therefore detailed description is omitted.

When the semantic label image is estimated in step 100 described above, the process proceeds to step 101.

In step 101, each label region reconstruction unit of the label 1 region image reconstruction unit 17A, label 2 region image reconstruction unit 17B, up to the label N region image reconstruction unit 17N reconstructs the original image from the semantic label image. Then, the process proceeds to step 103.

In step 103, the image synthesis unit 17D synthesizes the reconstructed image for each label reconstructed by the plurality of label region image reconstruction units. As a result, the entire reconstructed image is generated, and the process proceeds to step 104. Thereafter, the processing of the above steps 104 to 108 is performed.

As, described above, by providing the label region image reconstruction unit for each semantic label, the image region and image type assigned to each label region image reconstruction unit are restricted. Therefore, reconstruction accuracy in each semantic label region can be improved. Then, since the original image is reconstructed by combining the label regions with improved reconstruction accuracy, the reconstruction accuracy of the reconstructed image can also be improved.

Fourth Embodiment

Figure 7:
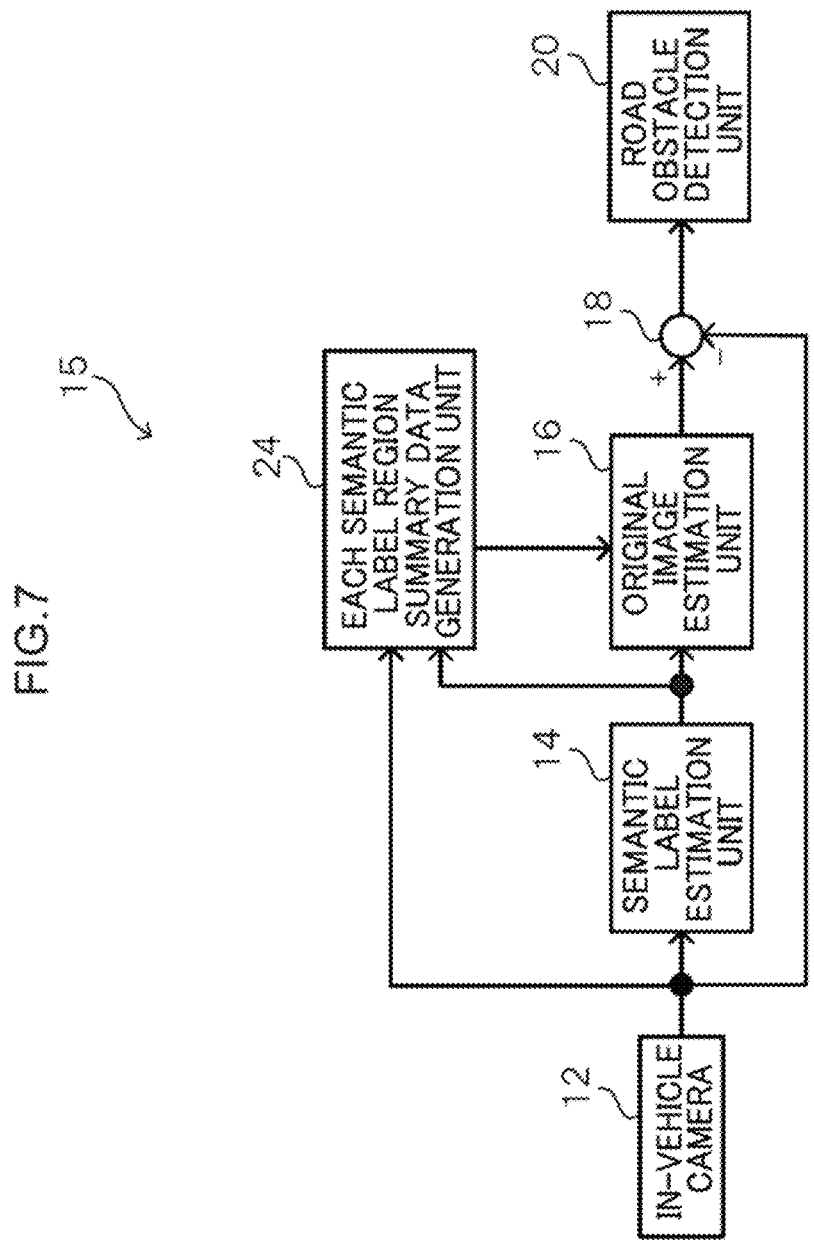
FIG. 7 is a block diagram illustrating a schematic configuration of a road obstacle detection device according to a fourth embodiment.

Next, a road obstacle detection device according to a fourth embodiment will be described. FIG. 7 is a block diagram illustrating a schematic configuration of a road obstacle detection device according to the fourth embodiment. The same components as those in the first embodiment are denoted by the same reference numerals, and therefore detailed description is omitted.

Compared to the first embodiment, the road obstacle detection device 15 according to the present embodiment further includes a semantic label region summary data generation unit 24 as a summary generation unit.

Figure 8:
FIG. 8 is a diagram showing an example in which a road region is randomly masked.

The semantic label region summary data generation unit 24 obtains image data from the in-vehicle camera 12 and obtains a semantic label image from the semantic label estimation unit 14. Then, from the acquired image data and the semantic label image, region summary data of each semantic label is generated and output to the original image estimation unit 16. Examples of the region summary data include an average, a maximum value, a minimum value, a standard deviation, a region area, a spatial frequency, and an edge image (for example, an algorithm such as Canny method that approximately extracts an edge image from an image), or a partially masked image. FIG. 8 shows an example of the partially masked image. Specifically, FIG. 8 shows an example in which the road region is randomly masked.

In FIG. 7, when reconstructing the original image from the semantic label image, the original image estimation unit 16 uses the semantic label region summary data generated by each semantic label region summary data generation unit 24 to reconstruct the original image from the semantic label image. As a result, the quality of the reconstructed image is improved for a portion where the estimation of the semantic label is correct. Therefore, the detection accuracy (S/N) of the portion where the estimation of the semantic label has failed can be improved.

Figure 9:
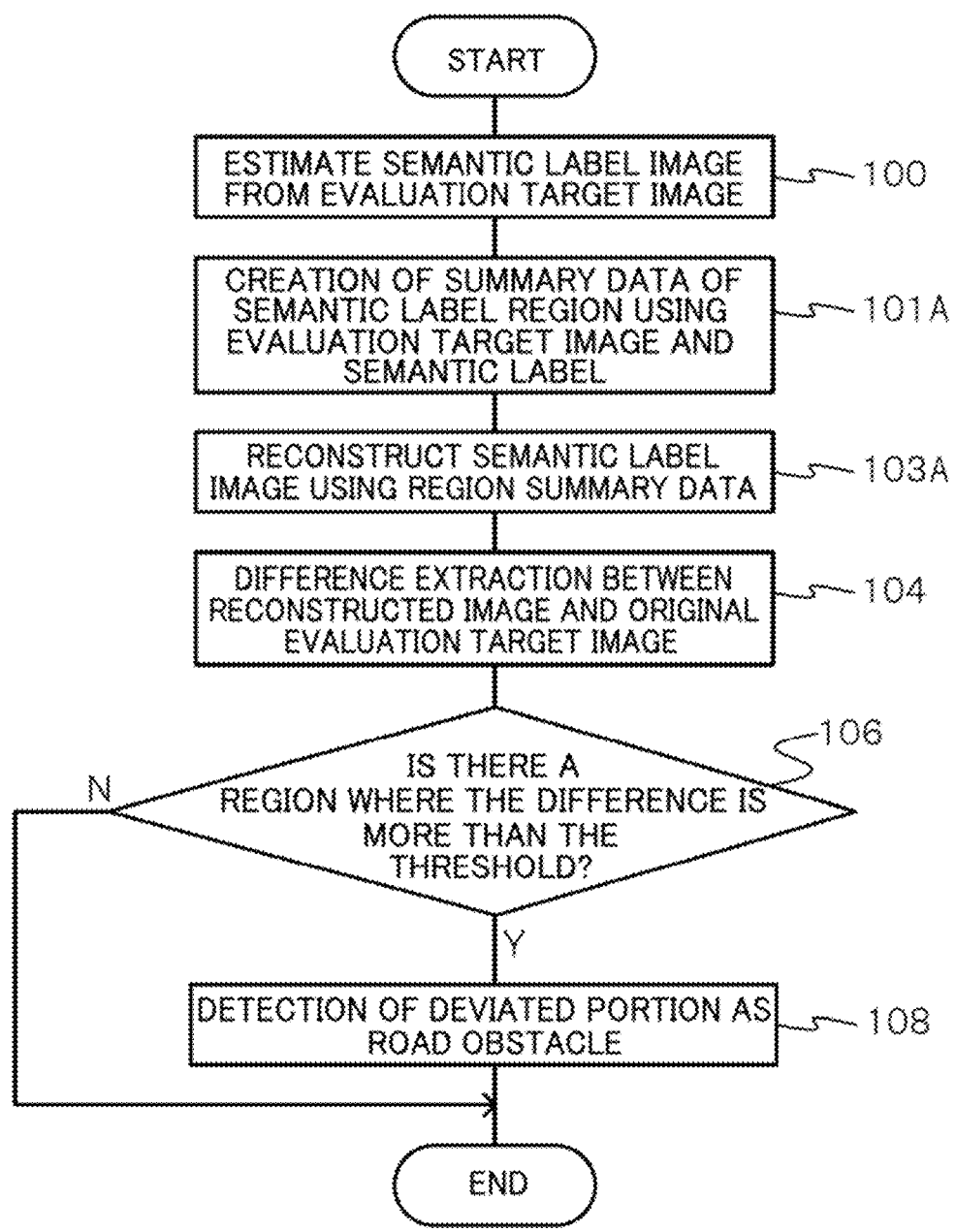
FIG. 9 is a flowchart illustrating an example of a flow of a process performed by a road obstacle detection device according to a fourth embodiment.

Next, a specific process performed by the road obstacle detection device 15 according to the present embodiment will be described. FIG. 9 is a flowchart illustrating an example of the flow of a process performed by the road obstacle detection device 15 according to the present embodiment. Note that the same processes as those in FIG. 2 are denoted by the same reference numerals, and therefore detailed description is omitted.

When the semantic label image is estimated in step 100 described above, the process proceeds to step 101A.

In step 101A, each semantic label region summary data generation unit 24 generates the region summary data of each semantic label using the image data of the evaluation target captured by the in-vehicle camera 12 and the semantic label image. Then, the process proceeds to a step 103A.

In step 103A, the original image estimation unit 16 reconstructs the original image from the semantic label image using the region summary data of the semantic label generated by each semantic label region summary data generation unit 24. Then, the process proceeds to step 104, and thereafter, the processes of steps 104 to 108 described above are performed.

As described above, in the present embodiment, each semantic label region summary data generation unit 24 generates the region summary data of each semantic label. Then, when reconstruction the original image from the semantic label image, the region summary data is used. Therefore, it is possible to improve the quality of the reconstructed image for a portion where the estimation of the semantic label is correct. Thereby, the detection accuracy (S/N) of the portion where the estimation of the semantic label has failed can be increased.

Fifth Embodiment

Figure 10:
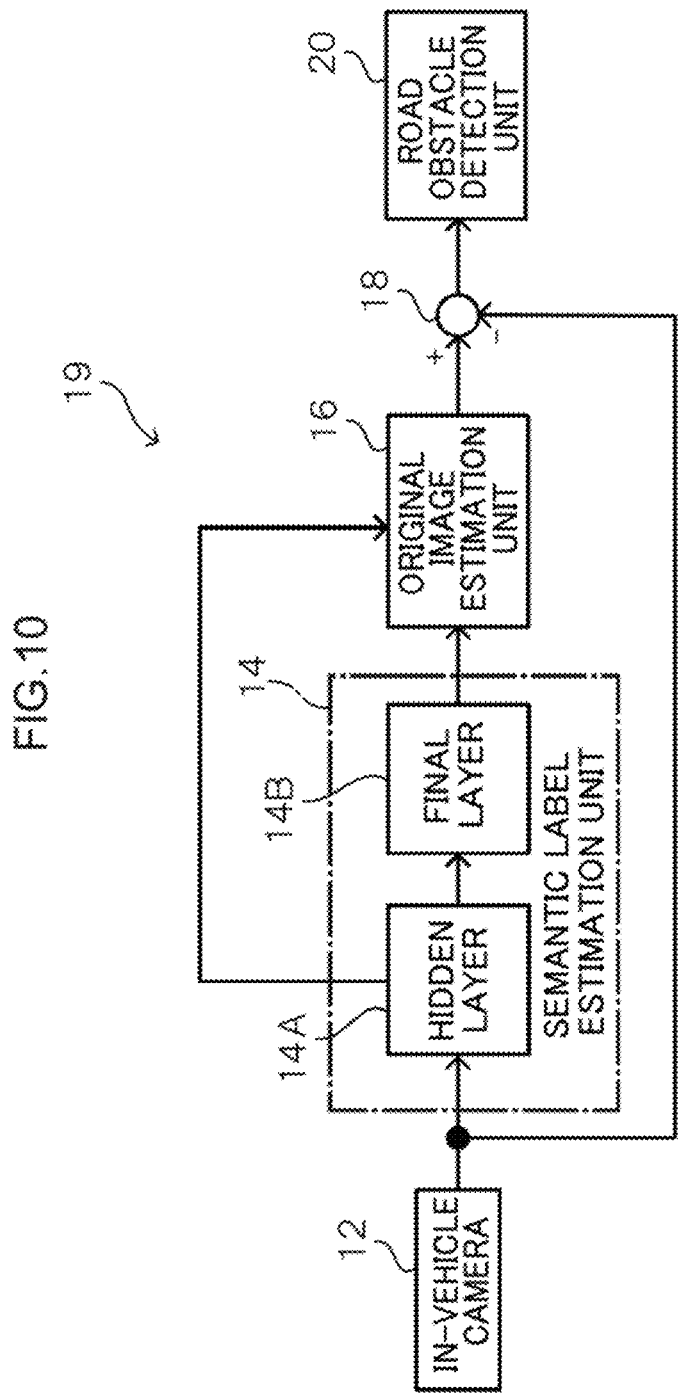
FIG. 10 is a block diagram illustrating a schematic configuration of a road obstacle detection device according to a fifth embodiment.

Subsequently, a road obstacle detection device according to a fifth embodiment will be described. FIG. 10 is a block diagram illustrating a schematic configuration of a road obstacle detection device according to the fifth embodiment. The same components as those in the first embodiment are denoted by the same reference numerals, and therefore detailed description is omitted.

In the road obstacle detection device 19 according to the present embodiment, compared to the first embodiment, the semantic label estimation unit 14 is configured to also output the semantic labels estimated in the hidden layer, which is an intermediate layer in the deep learning network, to the original image estimation unit 16. That is, the semantic label estimation unit 14 inputs the semantic label image estimated in the final layer 1413 and the output image of the hidden layer 14A that is not completely abstracted into the semantic label to the original image estimation unit 16.

Then, the original image estimation unit 16 reconstructs the original image based on the semantic label image estimated b the semantic label estimation unit 14 and the output image of the hidden layer 14A that is not completely abstracted. Since the output image of the hidden layer 14A has a high degree of reconstruction, the quality of the reconstructed image is improved for a portion where the estimation of the semantic label is correct, and the detection accuracy (S/N) is, improved.

Figure 11:
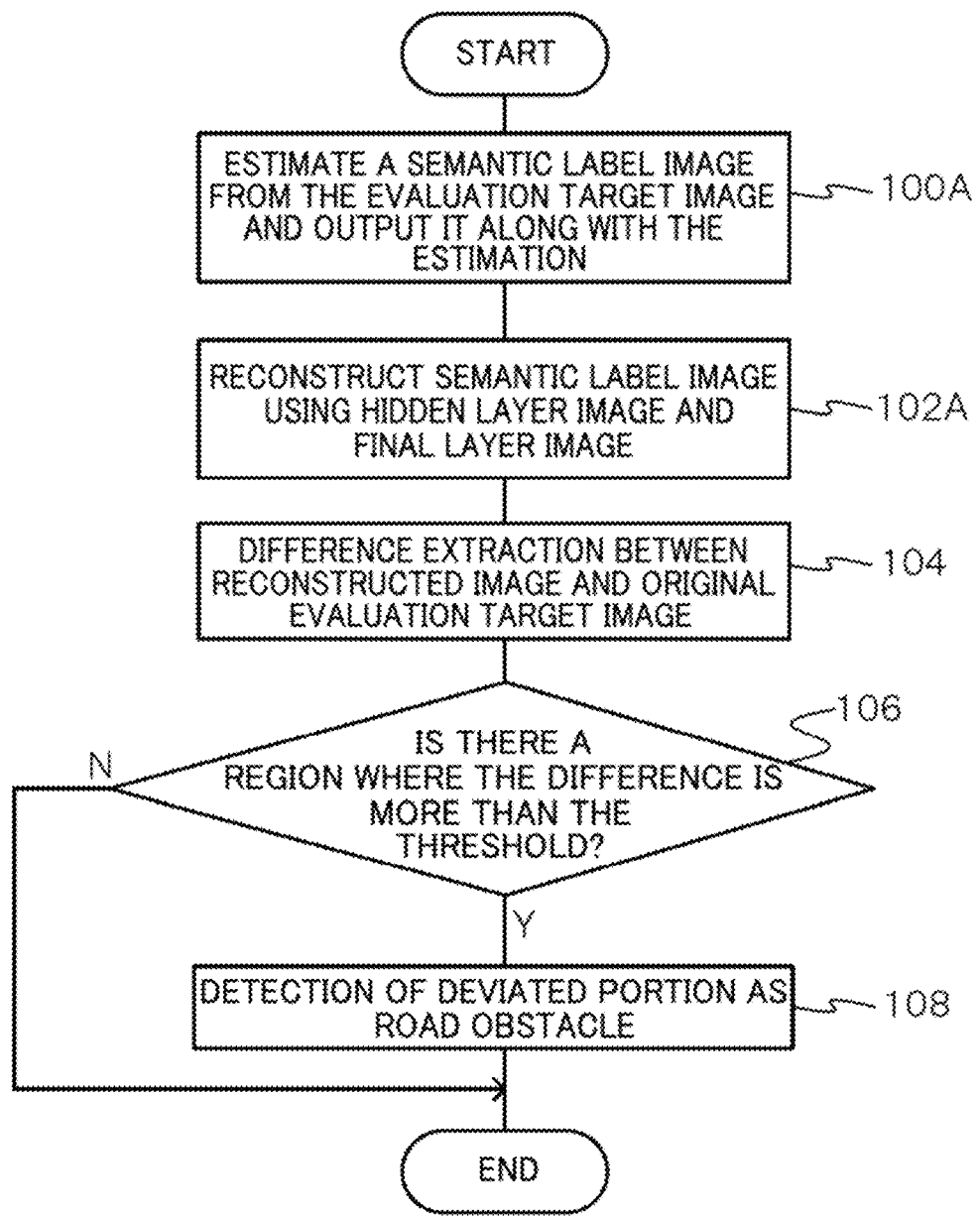
FIG. 11 is a flowchart illustrating an example of a flow of a process performed by a road obstacle detection device according to a fifth embodiment.

Next, a specific process performed by the road obstacle detection device 19 according to the present embodiment will be described. FIG. 11 is a flowchart illustrating an example of the flow of a process performed by the road obstacle detection device 19 according to the present embodiment. Note that the same processes as those in FIG. 2 tare denoted by the same reference numerals, and therefore detailed description is omitted.

In step 100A, the semantic label estimation unit 14 estimates a semantic label image from the evaluation target image captured by the in-vehicle camera 12, and outputs the semantic label image together with the output image of the hidden layer 14A during the estimation. Then, the process proceeds to step 102A. That is, a semantic label for each pixel of the image data obtained from the in-vehicle camera 12 is estimated using the classifier and the learned parameter that have been learned in advance by the deep learning, and a semantic label is assigned. As a result, the image is converted into a semantic label image and output to the original image estimation unit 16. Also, an output image of the hidden layer in the middle of the deep learning network is output.

In step 102A, the original image estimation unit 16 reconstructs the original image based on the semantic label image estimated by the semantic label estimation unit 14 and the output image of the hidden layer 14A that is not completely abstracted. Then, the process proceeds to step 104. Thereafter, the processing of the above steps 104 to 108 is performed.

As described above, in the present embodiment, when the original image is reconstructed from the semantic label image, the original image is reconstructed using the output image of the hidden layer 14A in the middle layer of deep learning network that estimates the semantic label. As a result, it is possible to improve the quality of the reconstructed image of the portion where the estimation of the semantic label is correct. As a result, it is possible to improve the detection accuracy (S/N) of the portion where the estimation of the semantic label has failed.

Sixth Embodiment

Figure 12:
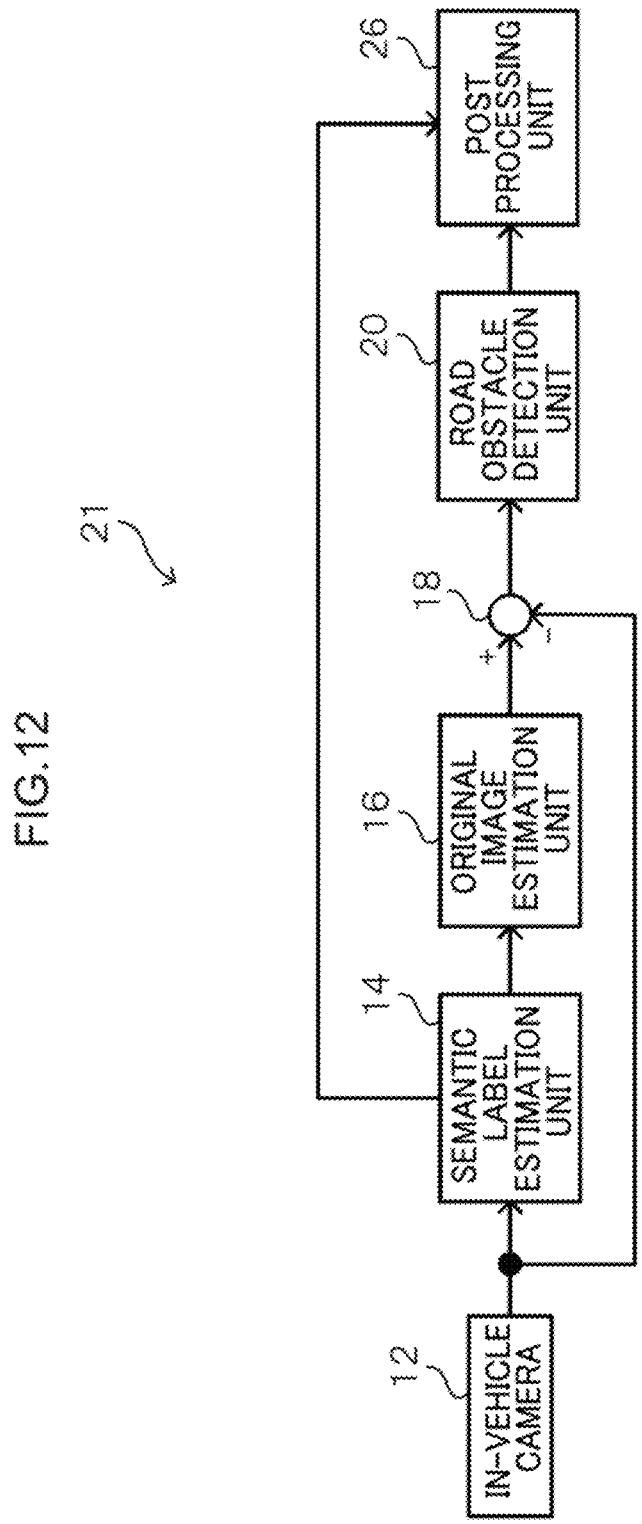
FIG. 12 is a block diagram illustrating a schematic configuration of a road obstacle detection device according to a sixth embodiment.

Next, a road obstacle detection device according to a sixth embodiment will be described. FIG. 12 is a block diagram illustrating a schematic configuration of a road obstacle detection device according to the sixth embodiment. The same components as those in the first embodiment are denoted by the same reference numerals, and therefore detailed description is omitted.

Compared to the first embodiment, the road obstacle detection device 21 according to the present embodiment further includes a post-processing unit 26. Note that the difference calculation unit 18, the road obstacle detection unit 20, and the post-processing unit 26 correspond to a detection unit that detects an obstacle as a road obstacle when the obstacle exhibits a degree of danger equal to or greater than a predetermined threshold value.

The post-processing unit 26 calculates the degree of danger of the road obstacle detected by the road obstacle detection unit 20 as a road obstacle candidate. Then, a process is performed in which a vehicle with a degree of danger equal to or greater than a predetermined threshold is identified as a road obstacle. As a result, only important road obstacles can be detected.

The post-processing unit 26 may, for example, calculate the degree of danger of an obstacle on the road based on at least one of art obstacle area, an obstacle lane position, a blacklist object match, an object/less, a distance to an obstacle based on a white line, and a visual saliency. The obstacle area is calculated, for example, as a proportion of an area occupied by the obstacle with respect to a road area as an indication of a degree of danger. In addition, the obstacle lane position is calculated as the distance from the own lane, as an indication of a degree of danger. In the blacklist object matching, the degree of danger is calculated using a predetermined degree of match between a dangerous obstacle and a template or a result of an object detection function. In an objectness, the degree of danger is calculated as an index indicating whether a boundary is clear and easily detected as a closed mass (for example, "What is an object?" Bogdan Alexe, Thomas Deselaets, Vittorio Ferrari: CVPR 2010: pages 73-80). 73-80). The visual saliency, as an indication of danger, is calculated by using the technique described in Japanese Patent Application Laid-Open No. 2018-194912.

Figure 13:
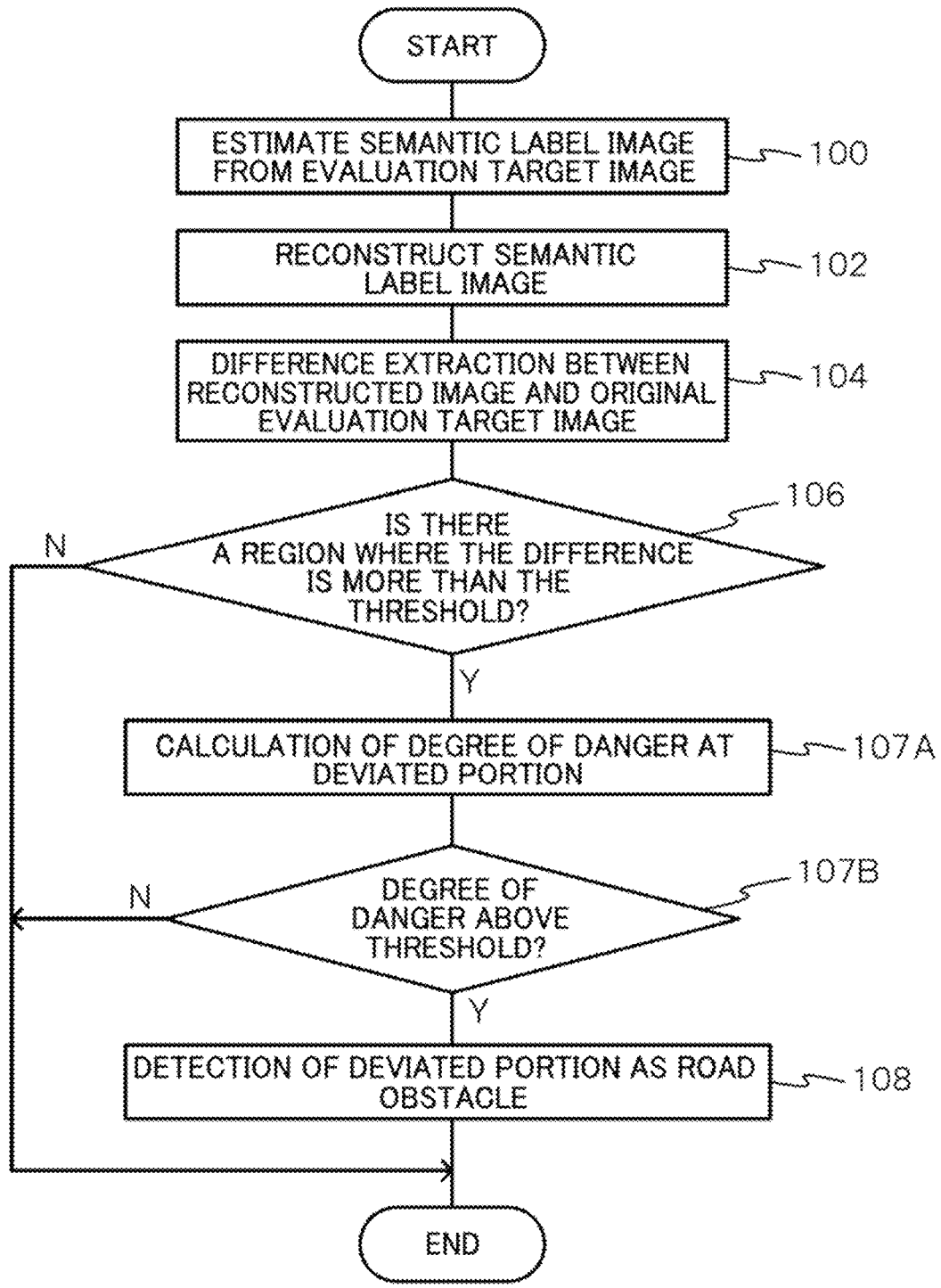
FIG. 13 is a flowchart illustrating an example of a flow of a process performed by a road obstacle detection device according to a sixth embodiment.

Next, a specific process performed by the road obstacle detection device 21 according to the present embodiment will be described. FIG. 13 is a flowchart illustrating an example of the flow of processing performed by the road obstacle detection device 21 according to the present embodiment. Note that the same processes as those in FIG. 2 are denoted by the same reference numerals, and therefore detailed description is omitted.

That is, after performing the above-described processing from step 100 to step 106, the process proceeds to step 107A.

In step 107A, the post-processing unit 26 calculates the degree of danger of region exhibiting deviation between the original image and the reconstructed image. Then, the process proceeds to step 107B. That is, the degree of danger is calculated for the road obstacle portion detected by the road obstacle detection unit 20.

In step 107B, the post-processing unit 26 determines whether or not the degree of danger is equal to or greater than, a predetermined threshold. When the determination is affirmed, the process proceeds to the above-described step 108, where it is determined, that there is an obstacle on the road. When the determination is denied, a series of processes is ended. In other words, it is possible to detect only important road obstacles having a high degree of danger with a degree of danger equal to or greater than the threshold as road obstacles.

Seventh Embodiment

Figure 14:
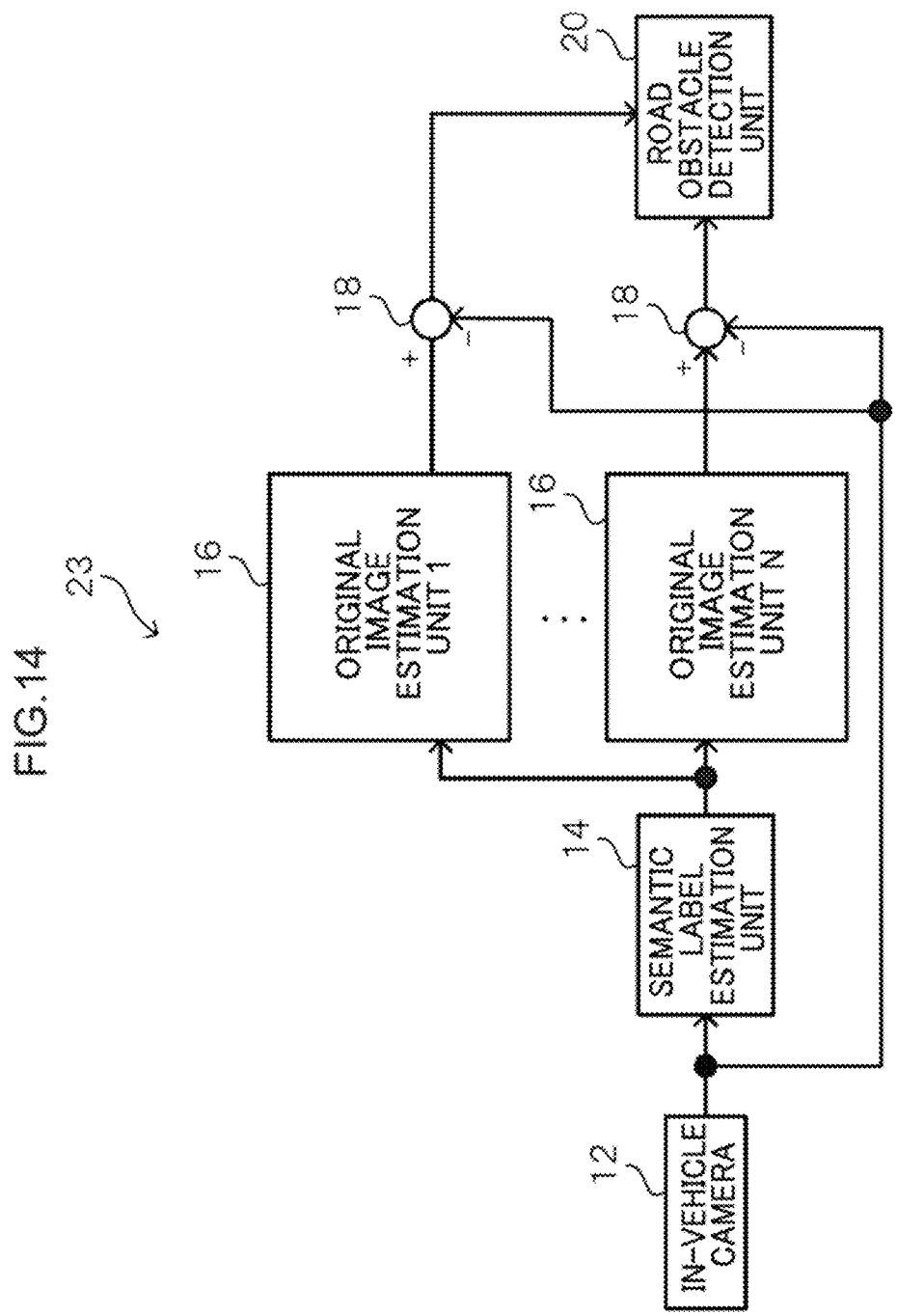
FIG. 14 is a block diagram illustrating a schematic configuration of a road obstacle detection device according to a seventh embodiment.

Subsequently, a road obstacle detection device according to a seventh embodiment will be described. FIG. 14 is a block diagram illustrating a schematic configuration of a road obstacle detection device according to the seventh embodiment. The same components as those in the first embodiment are denoted by the same reference numerals, and therefore detailed description is omitted.

In the road obstacle detection device 23 according to the present embodiment, a plurality (N) of the original image estimation units 16 and the difference calculation units 18 of the first embodiment are provided.

The plurality of original image estimation units 16 may estimate the original images with different neural network sizes, or may estimate the original images by different types of deep learning network.

A difference calculation, unit 18 is provided, for each of the plurality of original image estimation unit 16. Then, a result of comparing the estimation result of each original image estimation unit 16 with the original image is output to the road obstacle detection unit 20.

Then, the road obstacle detection unit 20 detects the position of the road obstacle from the plurality of difference images. For example, the road obstacle detection unit 20 may detect as a road obstacle for a location where a logical product (AND) or a logical sum (OR) of a plurality of difference images or a predetermined number or more of a plurality of difference images exhibiting a deviation equal to or greater than a threshold value is recognized at the same location, or a location exhibiting a deviation where a weighted sum of a plurality of difference images is greater than or equal to a threshold.

Figure 15:
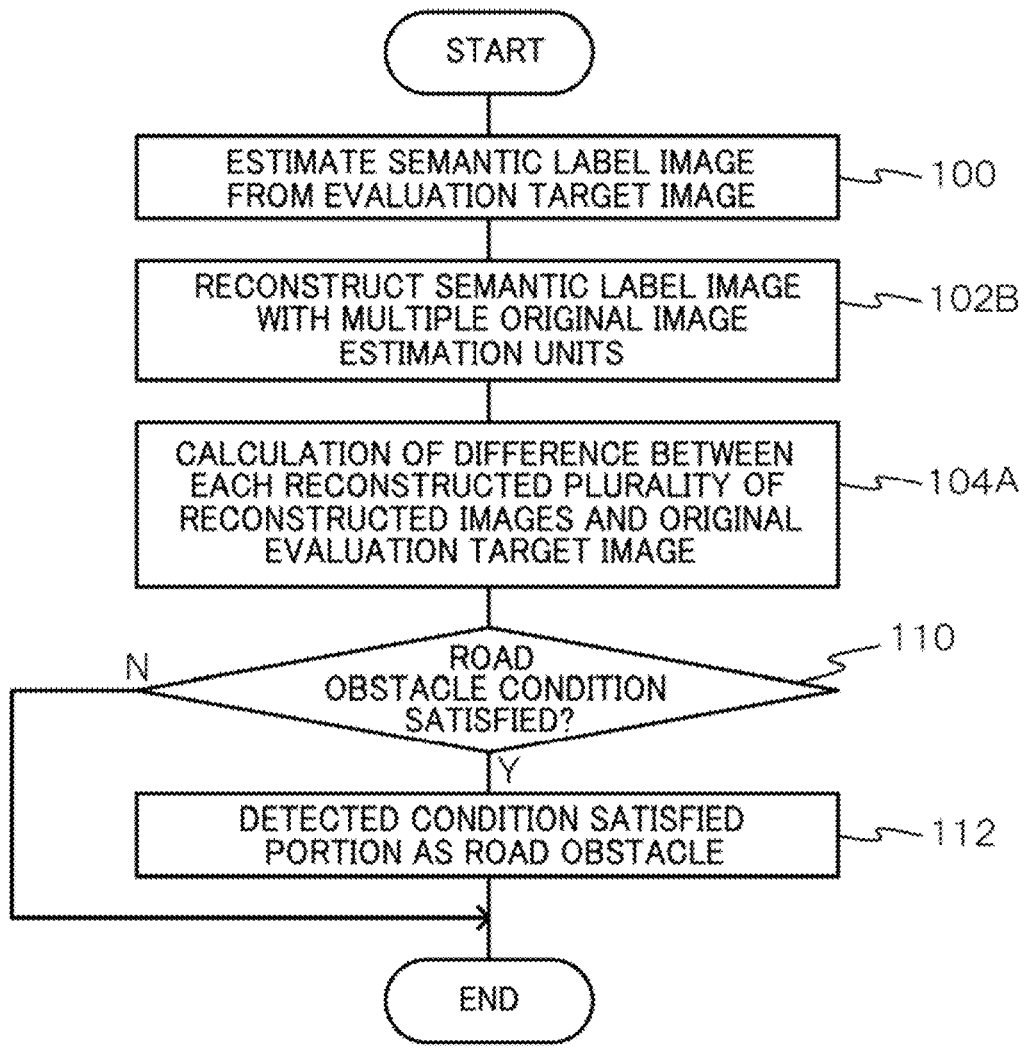
FIG. 15 is a flowchart illustrating an example of a flow of a process performed by the road obstacle detection device according to the seventh embodiment.

Next, a specific process performed by the road obstacle detection device 23 according to the present embodiment will be described. FIG. 15 is a flowchart illustrating an example of the flow of a process performed by the road obstacle detection device 23 according to the present embodiment. Note that the same processes as those in FIG. 2 are denoted by the same reference numerals, and therefore detailed description is omitted.

When the semantic label image is estimated in step 100 described above, the process proceeds to, step 102B.

In step 102B, the plurality of original image estimation units 16 reconstruct the semantic label images, and the process proceeds to step 104A.

In step 104A, the plurality of difference calculation units 18 calculate the difference between the reconstructed plurality of reconstructed images and the original image to be evaluated, and then proceed to step 110.

In step 110, the road obstacle detection unit 20 determines whether a road obstacle condition is satisfied. The determination may be, for example, detecting as a road obstacle for a location where a logical product (AND) or a logical sum (OR) of a plurality of difference images or a predetermined number or more of a plurality of difference images exhibiting a deviation equal to or greater than a threshold value is recognized at the same location, or a location exhibiting a deviation where a weighted sum of a plurality of difference images is greater than of equal to a threshold. Thereby, it is determined whether there is a region where the road obstacle condition is satisfied. When the determination is affirmed, the process proceeds to step 112, and when the determination is denied, a series of processing ends.

In step 112, the road obstacle detection unit 20 detects a portion where the road obstacle condition is satisfied as a road obstacle, and ends a series of processing.

As described above, the original image is estimated by the plurality of original image estimation units 16 and a deviation from the original image is determined. This makes it possible to more accurately estimate the position of the obstacle on the road.

Figure 16:
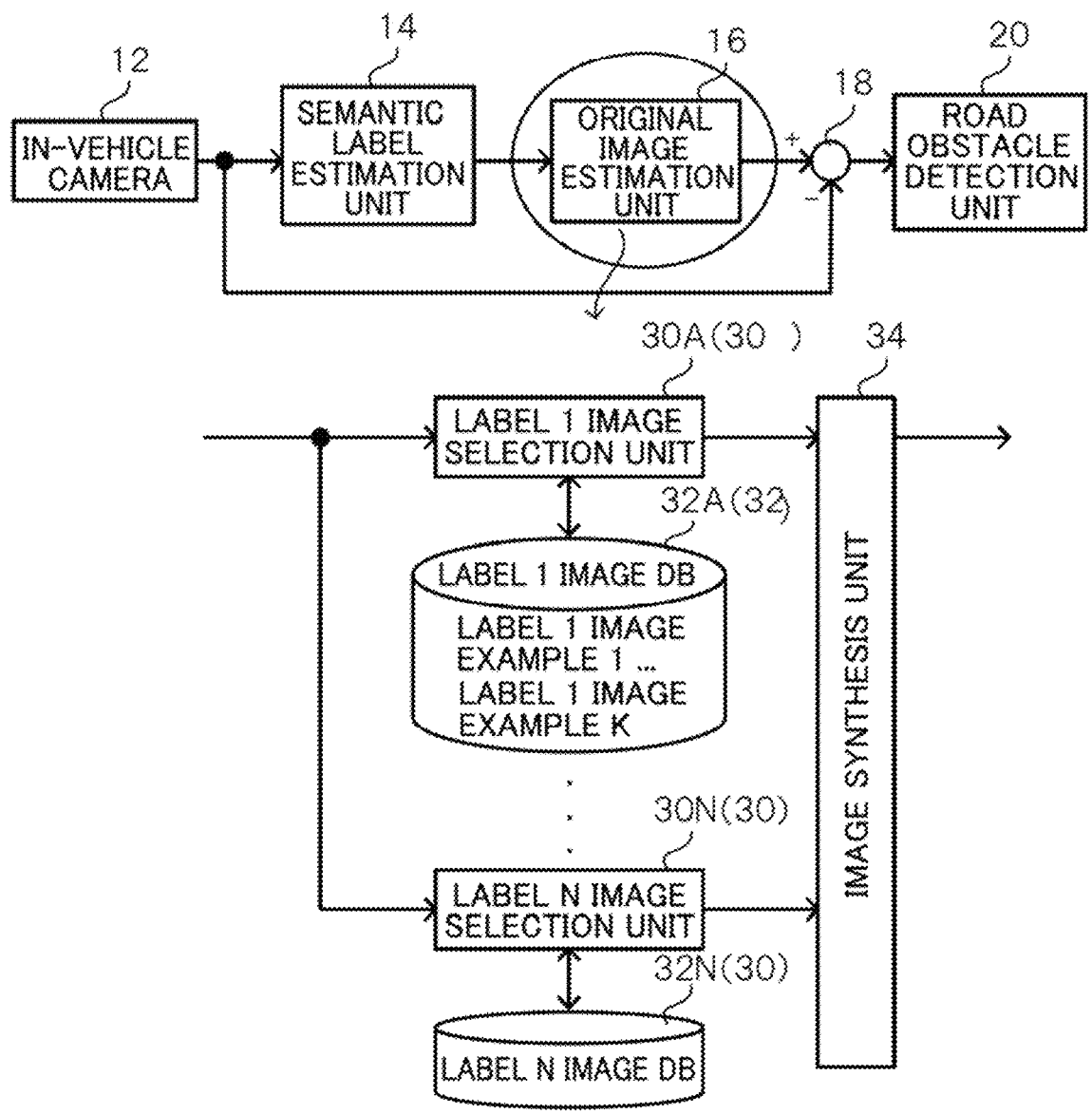
FIG. 16 is a block diagram illustrating a configuration example in which a plurality of label image examples are prepared for each semantic label, and a past label image is selected based on region data such as the size and shape of the semantic label to estimate a reconstructed image.

In the above embodiment, an example has been described in which the original image estimation unit 16 estimates an original image nom a semantic label image using deep learning. However, the present invention is not limited to this, and a mode in which the original image is estimated using a method other than deep learning may be used. For example, a plurality of label image examples may be prepared for each semantic label, and past label image may be selected based on region data such as the size and shape of the semantic label to estimate a reconstructed image. Specifically, as shown in FIG. 16, a label imam selection unit (label 1 image selection unit 30A to label N image selection unit 30N) 30 for each semantic label, a label image database 32 including a label 1 image DB (database) 32A through a label N image DR 32N corresponding to the label image selection unit, and an image synthesis unit 34 are provided. Each label image selection unit 30 selects a similar past label image based on the region data such as the size and shape of the semantic label, and combines the label images selected by the image synthesis unit 34 to reconstruct the reconstructed image.

Each of the above embodiments has been described individually. However, the present invention is not limited to this, and may be a form in which a plurality of embodiments are appropriately combined.

In addition, the processing performed by each unit of the road obstacle, detection devices 10, 11, 13, 15, 19, 21, and 23 in each of the above embodiments has been described as software processing performed by executing a program. However, it is not limited to this. For example, the processing may be a combination of both software and hardware. In the case of software processing, the program may be stored in various storage media and distributed.

Further, the present disclosure is not limited to the above, and it goes without saying that other various modifications can be made without departing from the gist of the present disclosure.

What is claimed is:

1. A road obstacle detection device comprising at least one processor configured to:
   estimate a semantic label for association with each pixel of an original image using a classifier that has been learned in advance, each semantic label being selected from a predetermined set of semantic labels;
   generate a semantic label image comprising the semantic labels associated with each pixel of the original image;
   generate a reconstructed image of the original image based on the generated semantic label image; and
   detect a road obstacle by comparing the original image and the reconstructed image.

2. The road obstacle detection device according to claim 1, wherein the at least one processor detects the road obstacle based on a portion where a difference between the reconstructed image and the original image is equal to or greater than a predetermined threshold.

3. The road obstacle detection device according to claim 1, wherein the at least one processor is configured to:
   extract a region represented in the original image comprising a road region and a road neighborhood region, and detect the road obstacle in the extracted region.

4. The road obstacle detection device according to claim 2, wherein the at least one processor is configured to:
   extract a region represented in the original image comprising a road region and a road neighborhood region, and
   detect the road obstacle in the extracted region.

5. The road obstacle detection device according to claim 1, wherein the at least one processor generates a plurality of reconstructed images respectively corresponding to each of a plurality of semantic labels, the plurality of semantic labels being at least a subset of the semantic labels in the semantic label image adjacent to each other.

6. The road obstacle detection device according to claim 2, wherein the at least one processor generates a plurality of reconstructed images respectively corresponding to each of a plurality of semantic labels, the plurality of semantic labels being at least a subset of the semantic labels in the semantic label image adjacent to each other.

7. The road obstacle detection device according to claim 1, wherein the at least one processor is configured to:
   generate region summary data of each semantic label, and
   reconstruct the original image using the generated region summary data.

8. The road obstacle detection device according to claim 2, wherein the at least one processor is configured to:
   generate region summary data of each semantic label, and
   reconstruct the original image using the generated region summary data.

9. The road obstacle detection device according to claim 1, wherein the classifier is learned by deep learning, and the at least one processor is configured to reconstruct the reconstructed image based on an intermediate semantic label image generated using an intermediate layer of a deep learning network and the generated semantic label image.

10. The road obstacle detection device according to claim 2, wherein the classifier is learned by deep learning, and the at least one processor is configured to reconstruct the reconstructed image based on an intermediate semantic label image generated using an intermediate layer of a deep learning network and the generated semantic label image.

11. The road obstacle detection device according to claim 1, wherein the at least one processor detects a candidate for the road obstacle by comparing the reconstructed image with the original image, calculates a degree of danger of the detected candidate, and detects the candidate with the degree of danger at least equal to a predetermined threshold as the road obstacle.

12. The road obstacle detection device according to claim 2, wherein the at least one processor detects a candidate for the road obstacle by comparing the reconstructed image with the original image, calculates a degree of danger of the detected candidate, and detects the candidate with the degree of danger at least equal to the predetermined threshold as the road obstacle.

13. The road obstacle detection device according to claim 1, wherein the at least one processor is configured to:
use a plurality of different reconstruction methods to respectively generate each of a plurality of reconstructed images of the original image; and
compare each of the plurality of reconstructed images with the original image, and detect the road obstacle based on each comparison result.

14. The road obstacle detection device according to claim 2, wherein the at least one processor is configured to:
use a plurality of different reconstruction methods to respectively generate each of a plurality of reconstructed images of the original image; and
compare each of the plurality of reconstructed images with the original image, and detect the road obstacle based on each comparison result.

15. A method for detecting an obstacle on a road comprising, by at least one processor:
estimating a semantic label for association with each pixel of an original image using a classifier learned in advance, each semantic label being selected from a predetermined set of semantic labels;
generating a semantic label image comprising the semantic labels associated with each pixel of the original image;
generating a reconstructed image of the original image based on a generated semantic label image; and
comparing the reconstructed image with the original image to detect a road obstacle.

16. A non-transitory computer-readable storage medium for storing a road obstacle detection program for causing a computer to:
estimate a semantic label for association with each pixel of an original image using a classifier that has been learned in advance, each semantic label being selected from a predetermined set of semantic labels;
generate a semantic label image comprising the semantic labels associated with each pixel of the original image;
generate a reconstructed image of the original image based on the generated semantic label image; and
compare the reconstructed image with the original image to detect a road obstacle.

17. The road obstacle detection device according to claim 5, wherein the at least one processor synthesizes the plurality of reconstructed images into a combined reconstructed image, and detects the road obstacle by comparing the original image and the combined reconstructed image.

18. The road obstacle detection device according to claim 5, wherein the at least one processor performs a plurality of comparisons each between the original image and a respective one of the plurality of reconstructed images and detects the road obstacle based on the plurality of comparisons.

19. The road obstacle detection device according to claim 5,
wherein the at least one processor comprises a plurality of independent processors, each of the plurality of reconstructed images being generated by a different processor of the plurality of independent processors, and
wherein calculation resources of the plurality of independent processors are distributed according to a reconstruction priority assigned to each of the plurality of semantic labels.

* * * * *